(12) United States Patent
Chen et al.

(10) Patent No.: US 10,069,189 B2
(45) Date of Patent: Sep. 4, 2018

(54) CABINET SERVER AND DATA CENTER BASED ON CABINET SERVER

(71) Applicant: Huawei Technologies Co., Ltd., Shenzhen (CN)

(72) Inventors: Shaojie Chen, Hangzhou (CN); Zhulin Wei, Shenzhen (CN); Junfeng Zhao, Shenzhen (CN); Rui He, Hangzhou (CN); Xiaowen Dong, Shenzhen (CN); Peng Lin, Shenzhen (CN); Wei Yang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 75 days.

(21) Appl. No.: 15/276,207

(22) Filed: Sep. 26, 2016

(65) Prior Publication Data

US 2017/0012340 A1    Jan. 12, 2017

Related U.S. Application Data

(63) Continuation of application No. PCT/CN2014/077670, filed on May 16, 2014.

(51) Int. Cl.
*H01Q 1/22* (2006.01)
*G06F 13/40* (2006.01)
*H04W 84/10* (2009.01)

(52) U.S. Cl.
CPC ....... *H01Q 1/2258* (2013.01); *G06F 13/4063* (2013.01); *H01Q 1/2291* (2013.01); *H04W 84/10* (2013.01)

(58) Field of Classification Search
CPC ............. H01Q 1/2258; H01Q 1/2291; G06F 13/4063; H04W 84/10
See application file for complete search history.

(56) References Cited

U.S. PATENT DOCUMENTS 5,754,948 A * 5/1998 Metze ............... H04B 7/00
455/41.2
6,882,867 B1 * 4/2005 Wiekert ............. H04W 88/08
455/446

(Continued)

FOREIGN PATENT DOCUMENTS

CN          102436610 A     5/2012
CN          102857291 A     1/2013
(Continued)

OTHER PUBLICATIONS

Machine Translation and Abstract of Chinese Publication No. CN102857291, Jan. 2, 2013, 7 pages.

(Continued)

*Primary Examiner* — Tho G Phan
(74) *Attorney, Agent, or Firm* — Conley Rose, P.C.

(57) ABSTRACT

A cabinet server and a data center where the cabinet server includes multiple function node layers vertically arranged to form a server core and multiple intra-cabinet antennas vertically arranged and disposed at one side of the server core, an intra-cabinet antenna is wirelessly connected to adjacent intra-cabinet antennas. A transmission path is formed of the vertically arranged intra-cabinet antennas when a radio signal is transmitted within the cabinet server. Since the intra-cabinet antennas are disposed at the side of the server core, electromagnetic radiation generated by the radio signal in a transmission process has a relatively small effect on the function nodes, thereby reducing the effect of the electromagnetic radiation on various electronic devices in the function nodes, improving service lives of the electronic devices, and improving transmission quality of the radio signal.

19 Claims, 10 Drawing Sheets

(56) References Cited

U.S. PATENT DOCUMENTS

| | | | |
|---|---|---|---|
| 8,094,020 B2* | 1/2012 | Groth | G06Q 10/087 340/539.1 |
| 8,362,878 B2* | 1/2013 | Molewyk | D06F 93/00 312/211 |
| 9,537,794 B2* | 1/2017 | Pettus | H04Q 1/15 |
| 2004/0195944 A1 | 10/2004 | Sugihara | |
| 2006/0234787 A1 | 10/2006 | Lee et al. | |
| 2006/0273962 A1* | 12/2006 | Brench | H01P 1/22 343/702 |
| 2007/0046552 A1* | 3/2007 | Marino | G06Q 10/08 343/720 |
| 2008/0114865 A1* | 5/2008 | Rothman | H04L 12/66 709/223 |
| 2010/0172292 A1 | 7/2010 | Ramachandran et al. | |
| 2011/0164880 A1 | 7/2011 | Davidson et al. | |
| 2011/0243074 A1 | 10/2011 | Shin et al. | |
| 2012/0311127 A1 | 12/2012 | Kandula et al. | |
| 2013/0027285 A1 | 1/2013 | Inada | |
| 2013/0107853 A1 | 5/2013 | Pettus et al. | |
| 2013/0215876 A1 | 8/2013 | Santos et al. | |
| 2014/0122910 A1 | 5/2014 | Chiu et al. | |

FOREIGN PATENT DOCUMENTS

| | | |
|---|---|---|
| CN | 103179517 A | 1/2013 |
| CN | 103098038 A | 5/2013 |
| CN | 203133891 U | 8/2013 |
| CN | 203276314 U | 11/2013 |
| CN | 103777734 A | 5/2014 |
| GB | 2398407 A | 8/2004 |
| JP | 2002341962 A | 11/2002 |
| RU | 131556 U1 | 8/2013 |
| WO | 2011126775 A2 | 10/2011 |

OTHER PUBLICATIONS

Machine Translation and Abstract of Chinese Publication No. CN103179517, Jun. 26, 2013, 12 pages.

Ramachandran, K., et al., "60 GHz Data-Center Networking: Wireless ⇒ Worry less?," 2008, 11 pages.

Wang, H., et al., "Architecture and Scheduling Mechanism of Wireless Data Center Networks," May 2012, 61 pages.

Al-Fares, M., et al., "A Scalable, Commodity Data Center Network Architecture," SIGCOMM, Aug. 17-22, 2008, 12 pages.

Halperin, D., et al., "Augmenting Data Center Networks with Multi-Gigabit Wireless Links," SIGCOMM, Aug. 15-19, 2011, 12 pages.

Garefalakis, P., et al., "Improving Datacenter Operations Management using Wireless Sensor Networks," IEEE International Conference on Green Computing and Communications, Conference on Internet of Things, and Conference on Cyber, Physical and Social Computing, 2012, pp. 195-202.

Zhou, X., et al., "Mirror Mirror on the Ceiling: Flexible Wireless Links for Data Centers," SIGCOMM, Aug. 13-17, 2012, 12 pages.

Shin, J, et al., "On the Feasibility of Completely Wireless Data Centers," Jan. 7, 2014, Paper #22, 14 pages.

Cvijetic, N., et al., "SDN and OpenFlow for Dynamic Flex-Grid Optical Access and Aggregation Networks," IEEE, 2013, 7 pages.

Wei, W., et al., "Wireless Technology for Data-Center Networks," ZTE Technology Journal, vol. 18, No. 4, Aug. 2012, 6 pages.

Foreign Communication From a Counterpart Application, Singapore Application No. 11201606112V, Singaporean Examination Report dated Jan. 27, 2017, 5 pages.

Foreign Communication From a Counterpart Application, Singapore Application No. 2017/2900772795Y, Singaporean Notice of Allowance dated Mar. 1, 2017, 2 pages.

Foreign Communication From a Counterpart Application, European Application No. 14891927.7, Extended European Search Report dated Feb. 16, 2017, 7 pages.

Foreign Communication From a Counterpart Application, PCT Application No. PCT/CN2014/077670, English Translation of International Search Report dated Feb. 17, 2015, 2 pages.

Foreign Communication From a Counterpart Application, PCT Application No. PCT/CN2014/077670, English Translation of Written Opinion dated Feb. 17, 2015, 7 pages.

Machine Translation and Abstract of Chinese Publication CN203133891, Aug. 14, 2013, 4 pages.

Foreign Communication From a Counterpart Application, Chinese Application No. 201480033040.4, Chinese Office Action dated Jun. 13, 2017, 7 pages.

Machine Translation and Abstract of Russian Publication No. RU131556, Aug. 20, 2013, 5 pages.

Foreign Communication From a Counterpart Application, Russian Application No. 2016137716, Russian Office Action dated Jun. 14, 2017, 6 pages.

Foreign Communication From a Counterpart Application, Russian Application No. 2016137716, English Translation of Russian Office Action dated Jul. 5, 2017, 4 pages.

Foreign Communication From a Counterpart Application, Japanese Application No. 2016-553851, Japanese Office Action dated Sep. 26, 2017, 3 pages.

Foreign Communication From a Counterpart Application, Japanese Application No. 2016-553851, English Translation of Japanese Office Action dated Sep. 26, 2017, 3 pages.

* cited by examiner

CABINET SERVER AND DATA CENTER BASED ON CABINET SERVER

CROSS-REFERENCE TO RELATED APPLICATIONS

This application is a continuation of International Application No. PCT/CN2014/077670, filed on May 16, 2014, which is hereby incorporated by reference in its entirety.

TECHNICAL FIELD

The present disclosure relates to a network architecture, and in particular, to a cabinet server and a data center based on the cabinet server.

BACKGROUND

A data center generally refers to a system that implements functions such as data centralized processing, data exchange, and data management within physical space. With development of technologies and advancement of the society, more data is generated, and a data center is increasingly important.

From a perspective of hardware composition, existing data centers generally include two types, that is, a wired data center and a wireless data center. The wired data center includes multiple cabinet servers centered on data processing and cables connecting components within the cabinet servers. As a communication passage between the cabinet servers and between the components within the cabinet servers, the cables are generally relatively large in quantity. The wired data center has problems of a bad maintainability and a bad fault-tolerance capability due to the large quantity of cables. In addition, scattered cables block a ventilation channel and cause bad heat sink performance. To resolve the problems, the wireless data center is widely applied. Since the wireless data center performs communication in a wireless manner, the foregoing problems of the wired data center can be well resolved.

However, the inventor finds in the study process of this application that, in the prior art, a radio signal is generally horizontally transmitted while a radio signal transmission is performed in a wireless data center, and electromagnetic radiation generated by the radio signal causes electromagnetic interference to electronic devices in the wireless data center, and affects service lives of the electronic devices and transmission quality of the radio signal.

SUMMARY

Embodiments of this application disclose a cabinet server and a data center based on the cabinet server in order to resolve a problem in the prior art that when a wireless data center performs communication, generated radiation affects a service life of an electronic device and transmission quality of a radio signal.

To resolve the foregoing technical problem, the embodiments of this application disclose the following technical solutions.

According to a first aspect, a cabinet server is provided, where the cabinet server includes at least two function nodes, multiple intra-cabinet antennas, and multiple inter-cabinet antennas, where the function nodes are vertically arranged, to form a server core, where the server core includes multiple function node layers, and each function node layer includes at least one function node, the intra-cabinet antennas are vertically arranged and are disposed at a side of the server core, an intra-cabinet antenna corresponding to each function node has a frequency needed by the corresponding function node, the intra-cabinet antenna and the corresponding function node are electrically connected, and adjacent intra-cabinet antennas are wirelessly connected, and each intra-cabinet antenna is configured to transmit, after receiving a radio signal, the radio signal to a vertically adjacent intra-cabinet antenna, until the radio signal is transmitted to a target intra-cabinet antenna of the multiple intra-cabinet antennas when the radio signal is transmitted within the cabinet server, and the target intra-cabinet antenna transmits the radio signal to a function node that is electrically connected to the target intra-cabinet antenna such that the function node analyzes and processes the radio signal.

With reference to the first aspect, in a first possible implementation manner of the first aspect, the cabinet server further includes a wireless data controller, and the wireless data controller is disposed outside the server core and is connected to an intra-cabinet antenna disposed at a top layer and an inter-cabinet antenna, each inter-cabinet antenna is disposed at a top of the server core, when the radio signal is transmitted between the cabinet server and another cabinet server, after obtaining the radio signal, the intra-cabinet antenna disposed at the top layer transmits the radio signal to the wireless data controller, and the wireless data controller transmits the radio signal to the connected inter-cabinet antenna, and the inter-cabinet antenna is configured to receive the radio signal transmitted by the wireless data controller and transmit the radio signal to the other cabinet server, and receive a radio signal transmitted by another cabinet server, and transmit, to the wireless data controller connected to the inter-cabinet antenna, the radio signal transmitted by the other cabinet server such that the wireless data controller transmits, to the intra-cabinet antenna at the top layer, the radio signal transmitted by the other cabinet server.

With reference to the first aspect, in a second possible implementation manner of the first aspect, the cabinet server further includes a wireless shield layer, where the wireless shield layer wraps the outside of the server core, and the intra-cabinet antennas, the inter-cabinet antennas, and the wireless data controller are disposed outside the wireless shield layer.

With reference to the first aspect, in a third possible implementation manner of the first aspect, the cabinet server further includes an antenna backplane, where the antenna backplane is disposed outside the wireless shield layer and configured to fasten the intra-cabinet antenna.

With reference to the first aspect, in a fourth possible implementation manner of the first aspect, the cabinet server further includes an extension plate, where the extension plate is disposed outside the wireless shield layer, is disposed in parallel with the function nodes, and is configured to fasten the intra-cabinet antenna.

With reference to the first aspect, or the first possible implementation manner of the first aspect, or the second possible implementation manner of the first aspect, or the third possible implementation manner of the first aspect, or the fourth possible implementation manner of the first aspect, in a fifth possible implementation manner of the first aspect, a hollow cavity is formed between adjacent function nodes.

With reference to the first aspect, in a sixth possible implementation manner of the first aspect, the function nodes include a computing node, a memory node, a storage node, and an input/output node.

With reference to the first possible implementation manner of the first aspect, in a seventh possible implementation manner of the first aspect, the cabinet server further includes a bottom inter-cabinet antenna disposed at a bottom of the server core, and a bottom wireless data controller that is disposed at the bottom of the server core and that is connected to the bottom inter-cabinet antenna, where the bottom wireless data controller is connected to a function node at a bottom layer, and the bottom wireless data controller is configured to transmit the radio signal to the bottom inter-cabinet antenna such that the bottom inter-cabinet antenna transmits the radio signal to another cabinet server after receiving a radio signal transmitted by the function node at the bottom layer, and transmit the radio signal to the bottom inter-cabinet antenna after receiving a radio signal transmitted by the bottom inter-cabinet antenna.

With reference to the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, or the seventh possible implementation manner of the first aspect, in an eighth possible implementation manner of the first aspect, the cabinet server further includes rack top antennas disposed above the intra-cabinet antenna disposed at the top layer, where the rack top antennas and the intra-cabinet antennas are vertically arranged, the rack top antennas and the intra-cabinet antennas at the top layer are wirelessly connected, and the rack top antennas and the wireless data controller are connected, and the rack top antenna is configured to receive a radio signal transmitted by the intra-cabinet antenna at the top layer and transmit the radio signal to the wireless data controller, and receive a radio signal transmitted by the wireless data controller and then transmit the radio signal to the intra-cabinet antenna at the top layer.

According to a second aspect, a data center is provided, where the data center includes the cabinet server according to the first aspect.

With reference to the second aspect, in a first possible implementation manner of the second aspect, in the data center, adjacent cabinet servers are wirelessly connected using an inter-cabinet antenna.

Embodiments of this application disclose a cabinet server and a data center based on the cabinet server. The cabinet server includes at least two function nodes, multiple intra-cabinet antennas, and multiple inter-cabinet antennas. The function nodes are vertically arranged, to form a server core, where the server core includes multiple function node layers, and each function node layer includes at least one function node. The intra-cabinet antennas are vertically arranged, disposed at a side of the server core, and electrically connected to corresponding function nodes, and adjacent intra-cabinet antennas are wirelessly connected.

When a radio signal is transmitted within a cabinet using the cabinet server disclosed in an embodiment of the present disclosure, after receiving a radio signal, an intra-cabinet antenna in the cabinet server transmits the radio signal to a vertically adjacent intra-cabinet antenna in order to implement transmission of the radio signal between adjacent intra-cabinet antennas. A transmission path of the radio signal is formed of vertically arranged intra-cabinet antennas. Because intra-cabinet antennas are disposed at a side of a server core formed of function nodes, electromagnetic radiation generated by the radio signal in a transmission process has a relatively small effect on the function nodes, thereby reducing the effect of the electromagnetic radiation on various electronic devices in the function nodes, improving service lives of the electronic devices, and improving transmission quality of the radio signal.

BRIEF DESCRIPTION OF DRAWINGS

To describe the technical solutions in the embodiments of the present disclosure or in the prior art more clearly, the following briefly describes the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following embodiments of the present disclosure provide a cabinet server and a data center in order to resolve a problem in the prior art that electromagnetic radiation affects a service life of an electronic device in a wireless data center and transmission quality of a radio signal.

To make a person skilled in the art understand the technical solutions in the embodiments of the present disclosure better, and make the objectives, features, and advantages of the embodiments of the present disclosure clearer, the following further describes the technical solutions in the embodiments of the present disclosure in detail with reference to the accompanying drawings.

Figure 1:
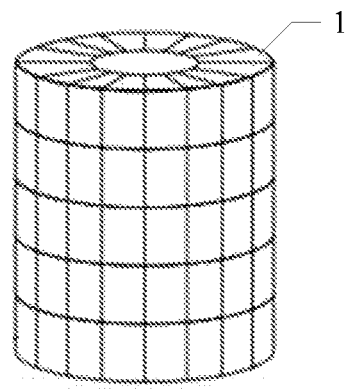
FIG. 1 is a schematic structural diagram of a cabinet server.
Figure 2:
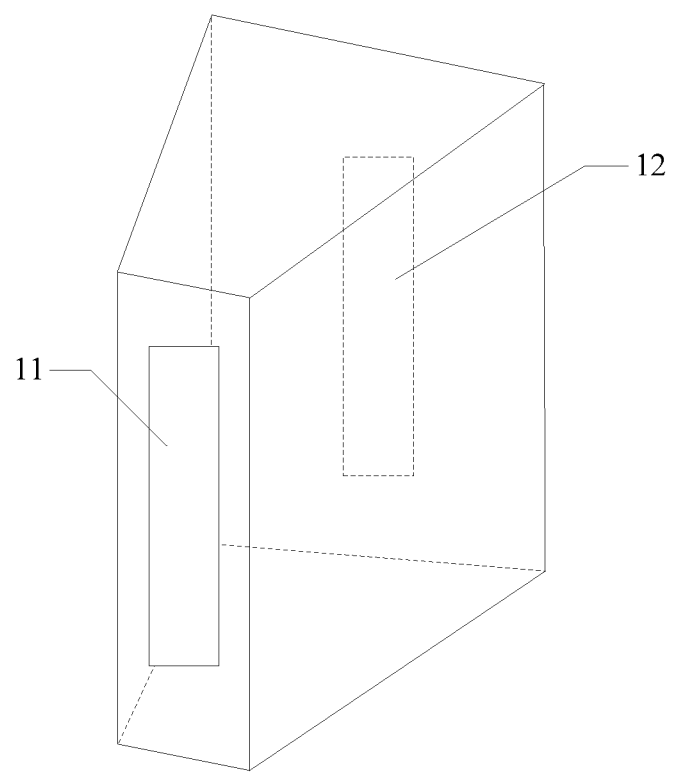
FIG. 2 is a schematic structural diagram of a processing module of a cabinet server.

A wireless data center generally includes multiple cabinet servers. Referring to a schematic structural diagram shown in FIG. 1, each cabinet server includes multiple processing modules 1. The processing modules 1 are generally set to have a wedge shape. Wedge-shape processing modules 1 at a same horizontal plane are arranged into a shape of a circular ring. A center of the circular ring is a spare area. Multiple layers of processing modules 1 are arranged into a cylinder, thereby constructing a cabinet server. A structure of the processing module 1 is shown in FIG. 2. The processing module 1 is provided with communications elements configured to transmit a radio signal. The communications elements include an intra-group communications element 11 and an inter-group communications element 12. The intra-group communications element 11 is disposed at an inner surface of the processing module 1, and the inter-group communications element 12 is disposed at an outer surface of the processing module 1. Moreover, each communications element may emit an electromagnetic energy beam that is focused in a particular direction.

Figure 3:
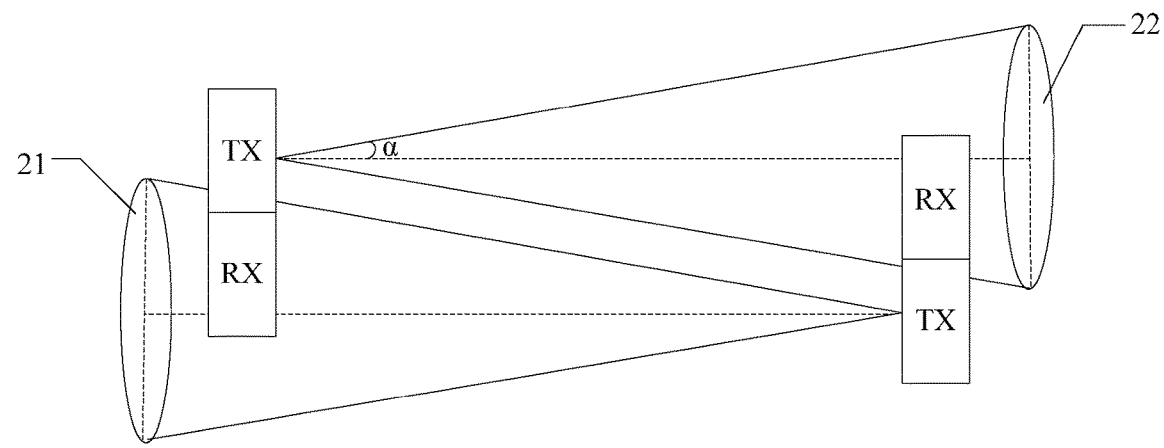
FIG. 3 is a schematic diagram of intra-group transmission performed by a processing module of a cabinet server.
Figure 4:
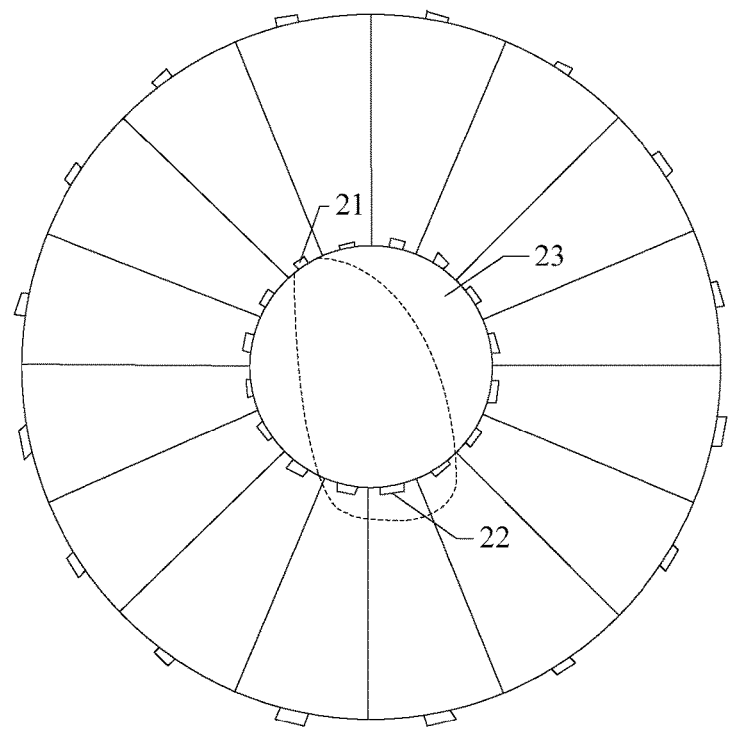
FIG. 4 is a schematic cross-sectional diagram of a cabinet server during intra-group transmission in a cabinet server.

Referring to FIG. 3, when radio signal intra-group transmission is performed, a first intra-group communications element 21 emitting a radio signal, that may be obtained in a form of an electromagnetic energy beam, using a sending module (transmit xmt (TX)), and transmits the radio signal to a receiving module (receive xmt (RX)) of a second intra-group communications element 22 within coverage of the electromagnetic energy beam using a spare area. Refer to a cross-sectional view of a cabinet server shown in FIG. 4. A center of the cabinet server is a spare area 23. A first intra-group communications element 21 transmits a radio signal in a form of an electromagnetic energy beam to a second intra-group communications element 22 using the spare area 23, thereby implementing radio signal intra-group transmission.

Figure 5:
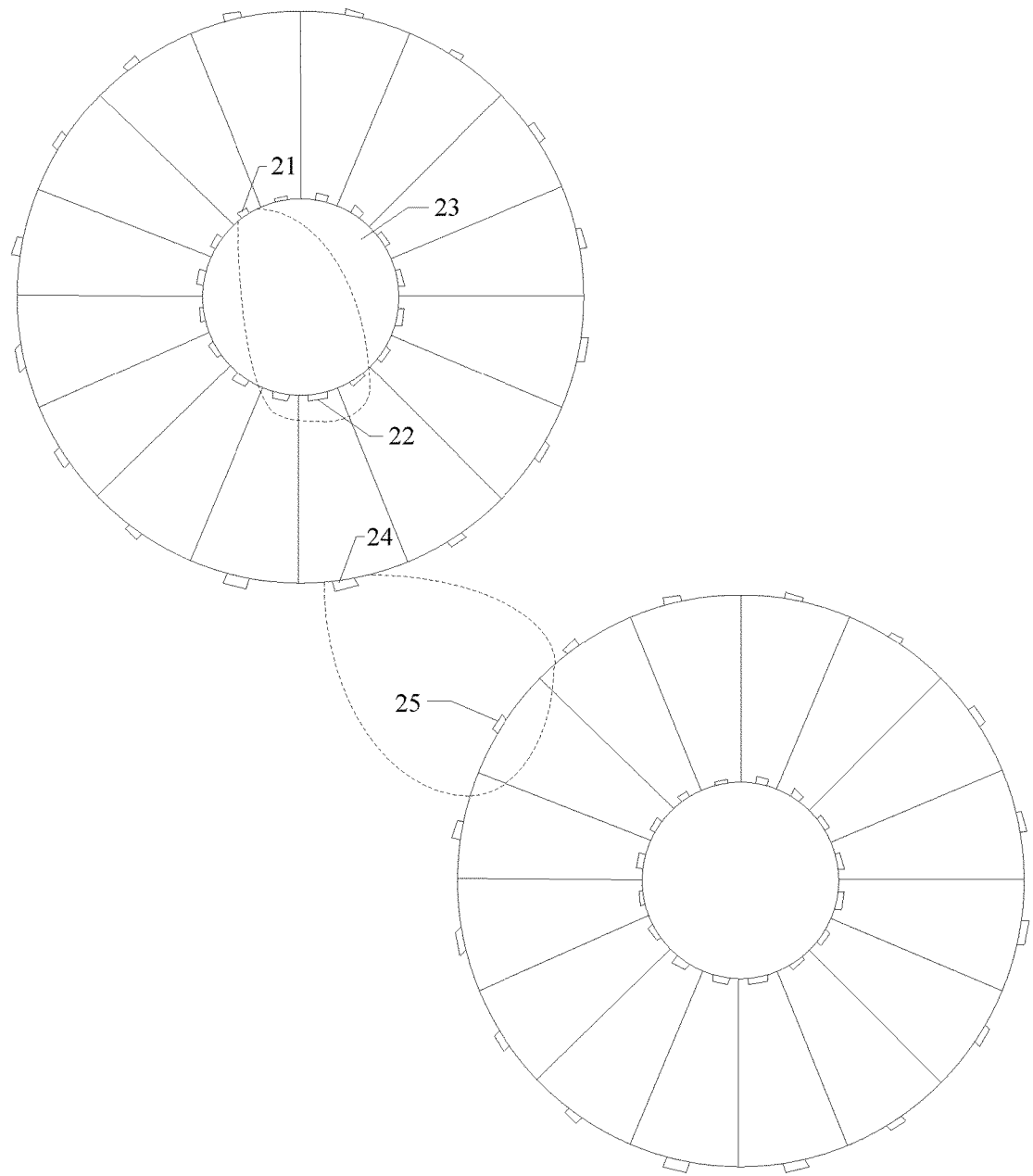
FIG. 5 is a schematic cross-sectional diagram of a cabinet server during inter-group transmission in a cabinet server.

A cross-sectional view of two cabinet servers performing radio signal transmission in radio signal inter-group transmission form is shown in FIG. 5. A second intra-group communications element 22 receiving a radio signal and transmits the radio signal to a second inter-group communications element 24 corresponding to the processing module, and the second inter-group communications element 24 transmits the radio signal to a processing module of another cabinet server in a form of an electromagnetic energy beam. A third inter-group communications element 25 disposed at the processing module of the other cabinet server receives the radio signal in order to implement radio signal inter-group transmission.

However, it can be learned according to the foregoing descriptions that when a radio signal is transmitted using a wireless data center, the radio signal generates electromagnetic radiation, the radio signal is horizontally transmitted in a processing module in a form of an electromagnetic energy beam, and the electromagnetic radiation generated by the radio signal causes electromagnetic interference to an electronic device in the processing module, thereby affecting a service life of the electronic device and transmission quality of the radio signal.

Figure 6:
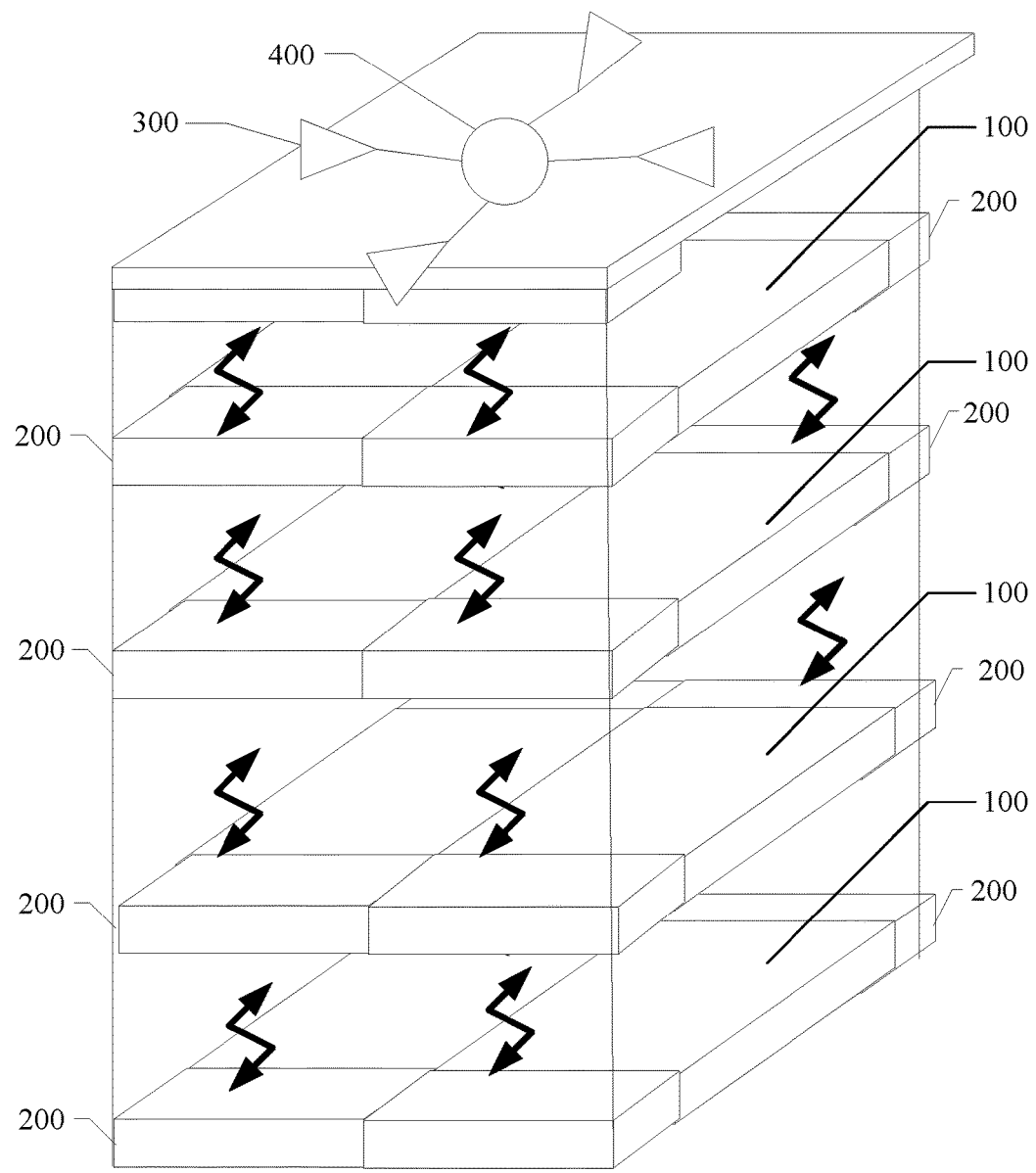
FIG. 6 is a front view of an architecture of a cabinet server disclosed in the present disclosure.
Figure 7:
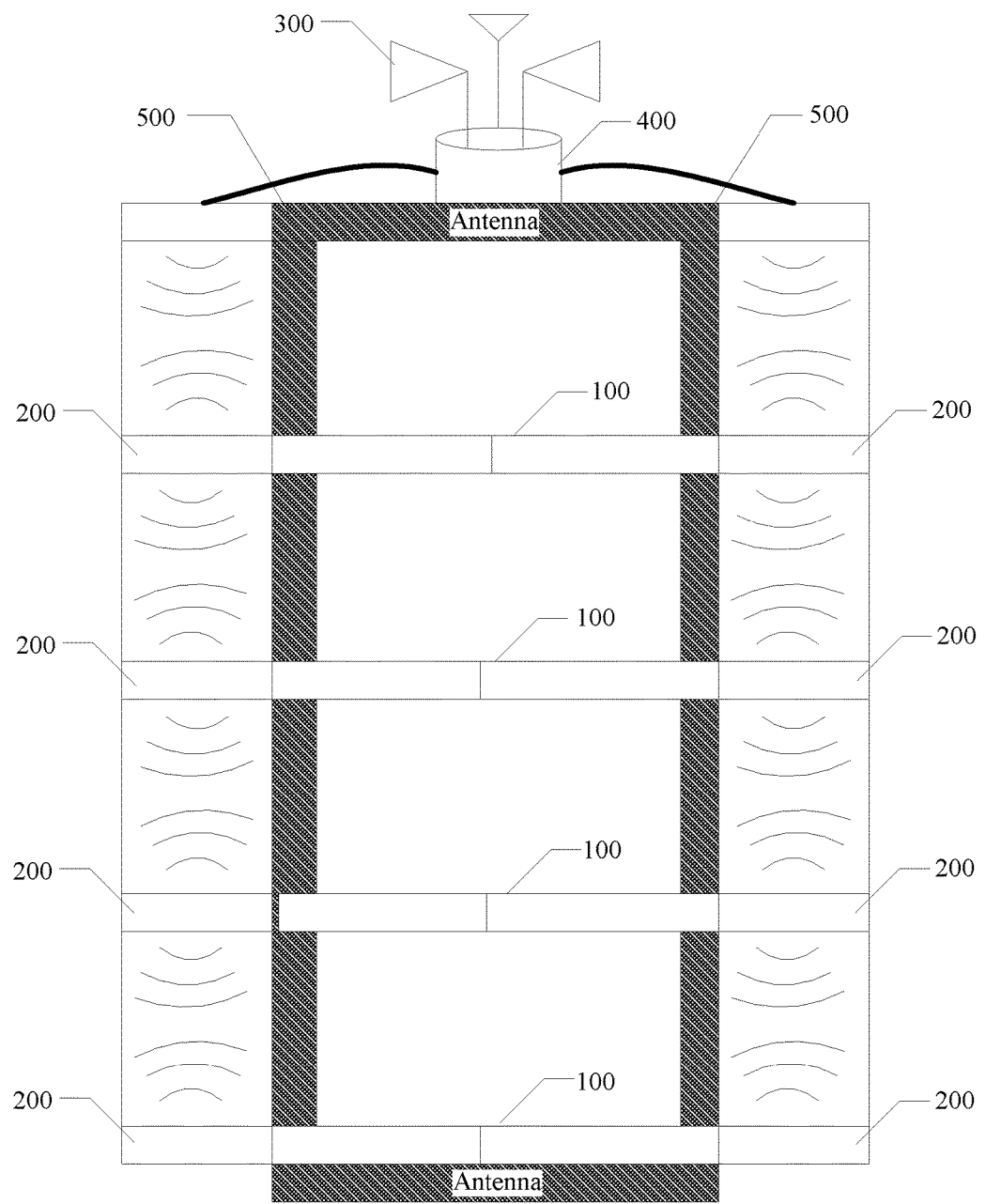
FIG. 7 is a side view of a structure of a cabinet server disclosed in the present disclosure.

To reduce interference of electromagnetic radiation to an electronic device and improve a service life of the electronic device and transmission quality of a radio signal, this application discloses a cabinet server. FIG. 6 is a front view of an architecture of a cabinet server disclosed in this application. FIG. 7 is a side view of a structure of a cabinet server disclosed in this application.

Referring to FIG. 6 and FIG. 7, the cabinet server includes at least two function nodes 100, multiple intra-cabinet antennas 200, and multiple inter-cabinet antennas 300.

The function nodes 100 are vertically arranged, to form a server core, where the server core includes multiple function node layers, and each function node layer includes at least one function node 100. In this application, a solution in which the server core is decoupled into multiple function nodes 100 is used such that a user decouples the server core into needed function nodes according to an application requirement, thereby implementing maximization of flexible resource configuration. In an actual application, according to an application requirement, the server core may be decoupled into multiple different function nodes. For example, a computing node, a memory node, a storage node, and an input/output (I/O) node may be configured in the server core. Correspondingly, radio signals received and sent by different function nodes are varied. For example, radio signals received and sent by the function nodes are computing request data, memory data, storage data, and I/O data when the computing node, the memory node, the storage node, and the I/O node are configured in the server core, respectively. The function nodes may include one or more processing modules.

The intra-cabinet antennas 200 are vertically arranged and are disposed at a side of the server core, an intra-cabinet antenna 200 corresponding to each function node 100 has a frequency needed by the corresponding function node 100, the intra-cabinet antenna 200 and the corresponding function node 100 are electrically connected. The adjacent intra-cabinet antennas 200 are wirelessly connected such that a radio signal is transmitted between intra-cabinet antennas that are vertically adjacent.

The intra-cabinet antenna 200 may be connected to the function node 100 in a one-to-one correspondence. In this case, the intra-cabinet antenna 200 that is in a one-to-one correspondence with the function node 100 has a frequency needed by the function node 100. In addition, two or more function nodes may be connected to a same intra-cabinet antenna having multiple needed frequencies if the intra-cabinet antenna includes frequencies needed by the two or more function nodes. The intra-cabinet antenna transmits a radio signal in a frequency division multiplexing manner.

When a radio signal is transmitted within the cabinet server, each intra-cabinet antenna 200 is configured to transmit, after receiving the radio signal, the radio signal to a vertically adjacent intra-cabinet antenna 200, until the radio signal is transmitted to a target intra-cabinet antenna of the multiple intra-cabinet antennas 200, and the target intra-cabinet antenna transmits the radio signal to a function node 100 that is electrically connected to the target intra-cabinet antenna such that the function node 100 analyzes and processes the radio signal.

When the radio signal is transmitted within the cabinet server, the intra-cabinet antenna 200 transmits the radio signal to the function node 100 connected to the intra-cabinet antenna 200 if the intra-cabinet antenna 200 obtains the radio signal, and the function node 100 determines whether the radio signal is data needed by the function node 100, and if not, the function node 100 transmits the radio signal to an intra-cabinet antenna 200 connected to the function node 100, and the connected intra-cabinet antenna 200 transmits the radio signal to another intra-cabinet antenna 200 that is vertically adjacent to the connected intra-cabinet antenna 200, or if yes, the function node 100 analyzes and processes the radio signal.

An embodiment of the present disclosure discloses a cabinet server. The cabinet server includes at least two function nodes, multiple intra-cabinet antennas, and multiple inter-cabinet antennas. The function nodes are vertically arranged, to form a server core, where the server core includes multiple function node layers, and each function node layer includes at least one function node. The intra-cabinet antennas are vertically arranged, disposed at a side of the server core, and electrically connected to corresponding function nodes, and adjacent intra-cabinet antennas are wirelessly connected.

When a radio signal is transmitted within a cabinet using the cabinet server disclosed in this embodiment, after receiving a radio signal, an intra-cabinet antenna in the cabinet server transmits the radio signal to a vertically adjacent intra-cabinet antenna in order to implement transmission of the radio signal between adjacent intra-cabinet antennas. A transmission path of the radio signal is formed of vertically arranged intra-cabinet antennas. Because intra-cabinet antennas are disposed at a side of a server core formed of function nodes, electromagnetic radiation generated by the radio signal in a transmission process has a relatively small effect on the function nodes, thereby reducing the effect of the electromagnetic radiation on various electronic devices in the function nodes, improving service lives of the electronic devices, and improving transmission quality of the radio signal.

The cabinet server further includes a wireless data controller 400.

The wireless data controller 400 is disposed outside the server core and is connected to an intra-cabinet antenna 200 disposed at a top layer and an inter-cabinet antenna 300.

The wireless data controller 400 is generally disposed at a top of the server core. In addition, the wireless data controller 400 may be further disposed at the side of the server core. There is generally one wireless data controller 400, or there may be multiple wireless data controllers 400. The multiple wireless data controllers 400 are separately connected to different intra-cabinet antennas 200 disposed at the top layer when there are multiple wireless data controllers 400.

Each inter-cabinet antenna 300 is disposed at the top of the server core.

When the radio signal is transmitted between the cabinet server and another cabinet server, after obtaining the radio signal, the intra-cabinet antenna 200 disposed at the top layer transmits the radio signal to the wireless data controller 400, and the wireless data controller 400 transmits the radio signal to the connected inter-cabinet antenna 300.

The inter-cabinet antenna 300 is configured to receive the radio signal transmitted by the wireless data controller 400 and transmit the radio signal to the other cabinet server, and receive a radio signal transmitted by another cabinet server, and transmit, to the wireless data controller 400 connected to the inter-cabinet antenna 300, the radio signal transmitted by the other cabinet server such that the wireless data controller 400 transmits, to the intra-cabinet antenna 200 at the top layer, the radio signal transmitted by the other cabinet server.

The wireless data controller 400 is configured to control the inter-cabinet antenna 300 to transmit the radio signal to another cabinet server after receiving a to-be-transmitted radio signal, or the wireless data controller 400 controls an inter-cabinet antenna 300 to transmit the radio signal to an intra-cabinet antenna 200 disposed at the top such that the intra-cabinet antenna 200 transmits a radio signal within the cabinet server after receiving a radio signal transmitted by another cabinet server.

The wireless data controller 400 transmits the data using a corresponding scheduling strategy according to a data feature of the received radio signal. For example, the wireless data controller 400 performs an analysis according to a data feature of the radio signal when the wireless data controller 400 obtains a radio signal, and the wireless data controller 400 transmits the radio signal to the inter-cabinet antenna 300 and controls the inter-cabinet antenna 300 to transmit the radio signal to the other cabinet server when the radio signal needs to be transmitted between the cabinet server and another cabinet server, or the inter-cabinet antenna 300 transmits the radio signal to an intra-cabinet antenna 200 when the radio signal needs to be transmitted within the cabinet server, and transmission of the radio signal within the cabinet server is implemented using the intra-cabinet antenna 200.

The inter-cabinet antenna 300 is generally disposed at a top of the cabinet server. In addition, the inter-cabinet antenna 300 may be further disposed at two sides of the cabinet server.

When a radio signal is transmitted between different cabinet servers using the cabinet server disclosed in the foregoing embodiment, an intra-cabinet antenna disposed at a top layer, a wireless data controller, and inter-cabinet antennas form a transmission path, and the radio signal does not pass through function nodes, thereby reducing an effect of electromagnetic radiation generated by the radio signal on various electronic devices in the function nodes, improving service lives of the electronic devices, and improving transmission quality of the radio signal.

Furthermore, according to FIG. 7 the cabinet server further includes a wireless shield layer 500.

The wireless shield layer 500 wraps the outside of the server core, and the intra-cabinet antennas 200, the inter-cabinet antennas 300, and the wireless data controller 400 are disposed outside the wireless shield layer 500.

The wireless shield layer 500 is generally made of a metal material. The intra-cabinet antennas 200, the inter-cabinet antennas 300, and the wireless data controller 400 are all disposed outside the wireless shield layer 500, and the server core including the function nodes 100 is disposed inside the wireless shield layer 500. Therefore, the wireless shield layer can shield the electromagnetic radiation generated by a radio signal when the radio signal is transmitted, thereby avoiding the effect of the electromagnetic radiation on various electronic devices in the server core, and further improving service lives of the electronic devices and transmission quality of the radio signal.

Figure 8:
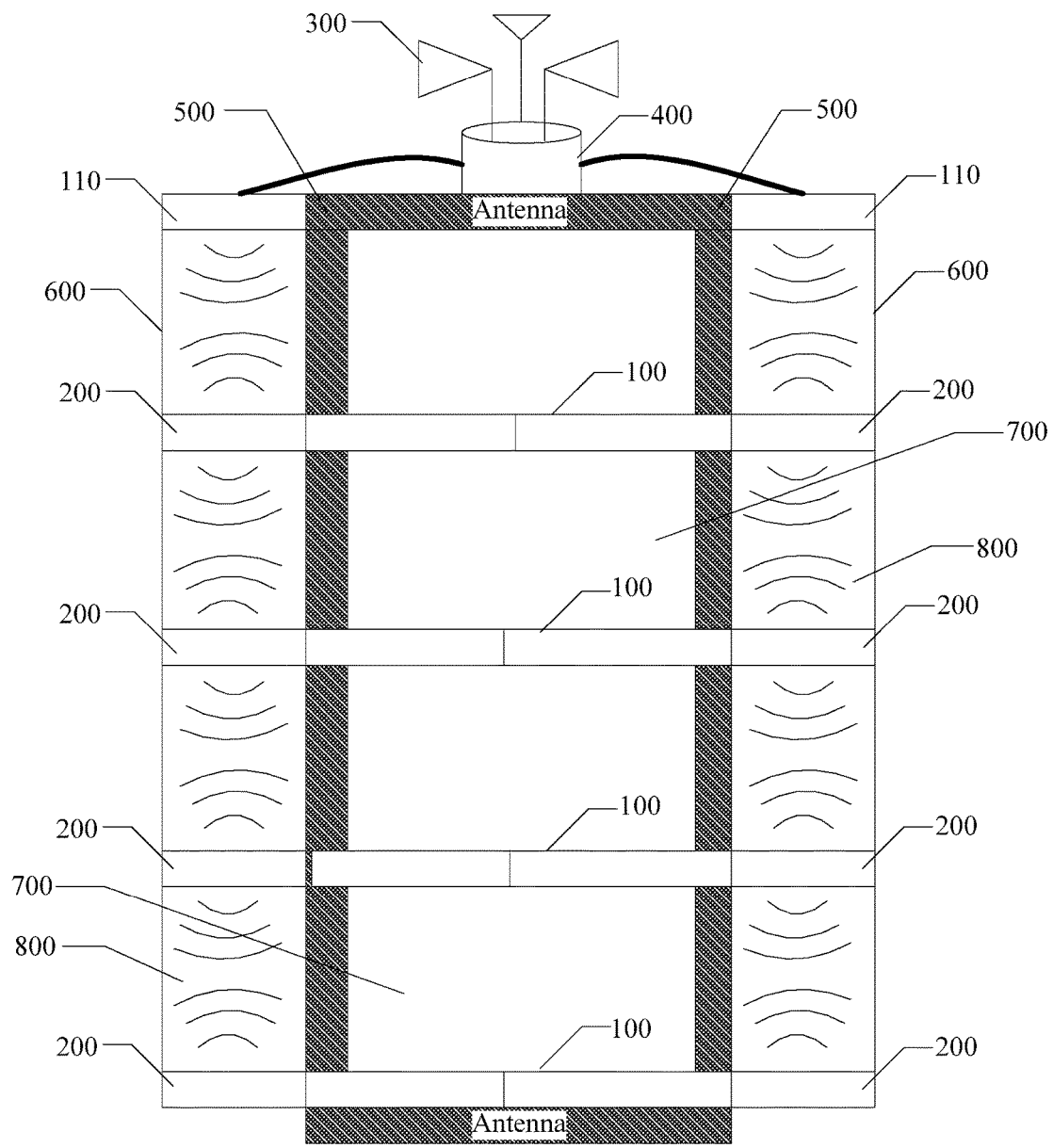
FIG. 8 is a side view of a structure of another cabinet server disclosed in the present disclosure.

Referring to a side view of a cabinet server shown in FIG. 8, the cabinet server disclosed in this application further includes an antenna backplane 600.

The antenna backplane 600 is disposed outside the wireless shield layer 500 and configured to fasten the intra-cabinet antenna 200.

The antenna backplane 600 is generally disposed between the wireless shield layer 500 and a housing of the cabinet server. The intra-cabinet antenna 200 can be fastened using the antenna backplane 600, and the antenna backplane 600 is generally made of a metal material, which not only can prevent leakage of a radio signal, but also can isolate radiation generated by a radio signal in another cabinet server.

In addition, the intra-cabinet antenna 200 can be further fastened in another form, for example, using an internal fastening method. In this case, the cabinet server further includes an extension plate. The extension plate is disposed outside the wireless shield layer 500, is disposed in parallel with the function nodes, and is configured to fasten the intra-cabinet antenna 200. The extension plate may be a protruding structure disposed on the wireless shield layer 500, or an extension portion of the function node 100, and the wireless shield layer 500 is disposed between the function node 100 and the extension portion.

Further, in the cabinet server, a hollow cavity is formed between adjacent function nodes 100, and the hollow cavity may be referred to as a node cavity 700. Setting of the node cavity 700 helps the function node 100 perform heat dissipation, thereby improving a service life of the cabinet server.

In the cabinet server disclosed in this embodiment of this application, if the intra-cabinet antenna 200 is fastened by means of the antenna backplane 600, when the node cavity 700 is formed between adjacent function nodes 100, an antenna cavity 800 is correspondingly formed between intra-cabinet antennas 200 correspondingly connected to the function nodes 100. Existence of the antenna cavity 800 helps improve heat sink performance of the cabinet server.

Further, in the cabinet server disclosed in this embodiment of this application, the intra-cabinet antenna 200 is connected to a corresponding function node 100 using a microstrip.

Figure 9:
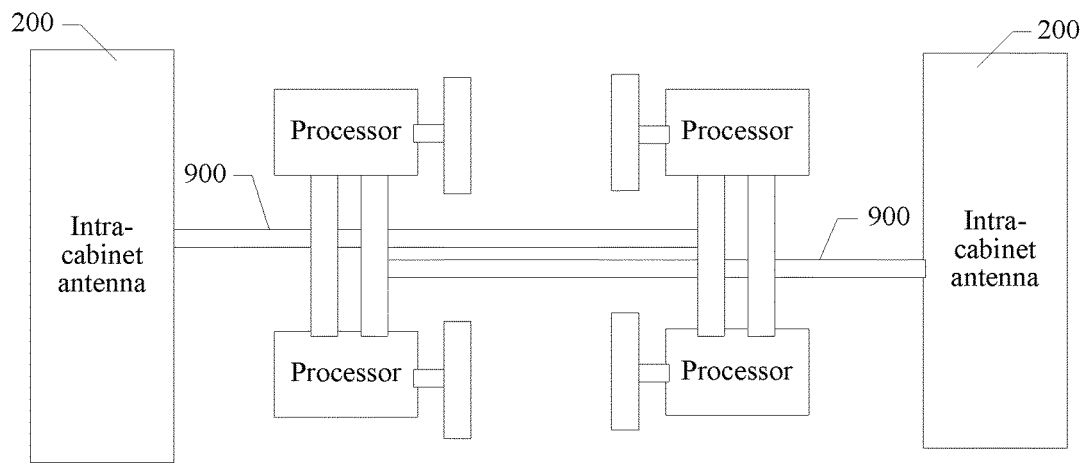
FIG. 9 is a schematic architectural diagram of a computing node disclosed in the present disclosure.
Figure 10:
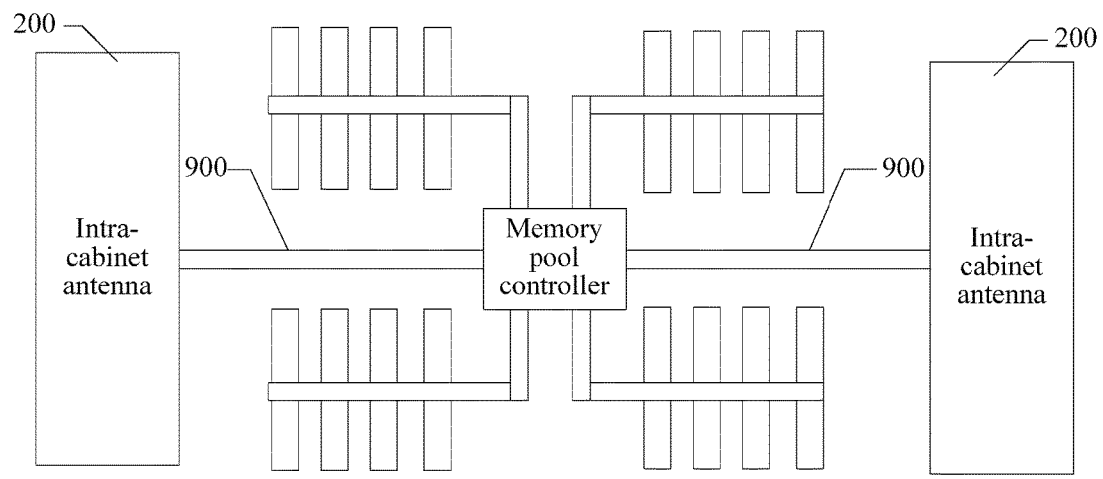
FIG. 10 is a schematic architectural diagram of a memory node disclosed in the present disclosure.

When the function nodes 100 include a computing node and a memory node, separately refer to a schematic architectural diagram of the computing node shown in FIG. 9 and a schematic architectural diagram of the memory node shown in FIG. 10. Multiple processors are disposed in the computing node, and are connected to corresponding intra-cabinet antennas 200 using microstrips 900. A memory pool controller and multiple memory modules connected to the memory pool controller are disposed inside the memory node, and the memory pool controller and the multiple memory modules are connected to corresponding intra-cabinet antennas 200 using microstrips 900.

The microstrip has advantages of a small volume, being lightweight, use of a wide frequency band, high reliability, and low manufacturing costs, and can carry radio signals of different frequencies. Use of the microstrip helps the function node transmit a radio signal in a wireless frequency division multiplexing manner, thereby implementing path sharing and improving transmission efficiency.

Figure 11:
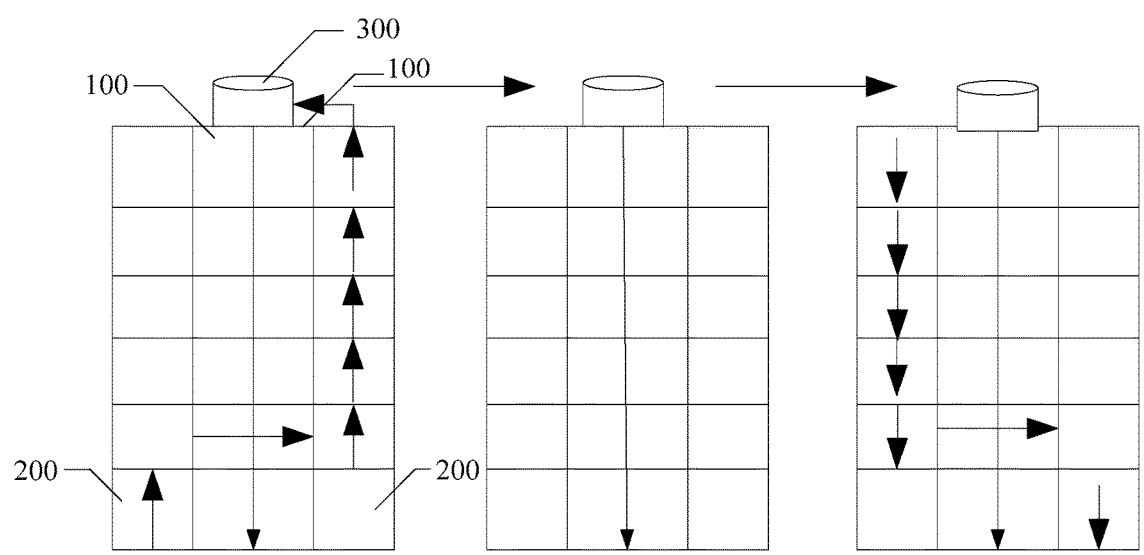
FIG. 11 is a schematic diagram of transmitting a radio signal using a cabinet server disclosed in the present disclosure.

Refer to a schematic diagram of radio signal transmission shown in FIG. 11. When a cabinet server disclosed in this embodiment of this application transmits a radio signal, a first function node determines whether an obtained radio signal is needed by the first function node using a method for address segment parsing and routing table query, and if yes, the first function node analyzes and processes the obtained radio signal, or if not, the first function node transmits the obtained radio signal to an intra-cabinet antenna connected to the first function node, the intra-cabinet antenna correspondingly connected to the first function node transmits the radio signal to a vertically adjacent intra-cabinet antenna, after receiving the radio signal, the vertically adjacent intra-cabinet antenna transmits the radio signal to a second function node correspondingly connected to the vertically adjacent intra-cabinet antenna, and the second function node correspondingly connected to the vertically adjacent intra-cabinet antenna determines whether the radio signal is needed by the second function node.

After a function node disposed at a top layer obtains a radio signal and knows by means of determining that the radio signal is not needed, an intra-cabinet antenna correspondingly connected to the function node at the top layer transmits the radio signal to a wireless data controller. The inter-cabinet antennas receive the radio signal transmitted by the wireless data controller, and transmit the radio signal to another cabinet server under control of the wireless data controller. A wireless data controller of the other cabinet server determines whether the radio signal is needed by the wireless data controller after receiving the radio signal, and the wireless data controller continues to transmit the radio signal to another cabinet server if the radio signal is not needed, or the other cabinet server transmits, using an intra-cabinet antenna, the radio signal to a function node corresponding to the radio signal after receiving the radio signal if the radio signal is needed.

For example, when function nodes disposed in the server core from a bottom layer to a top layer are sequentially an I/O node, a storage node, a memory node, and a computing node, when the I/O node obtains a radio signal and knows by means of determining that the radio signal is not I/O data needed by the I/O node, the I/O node transmits the radio signal to a first intra-cabinet antenna connected to the I/O node. The first intra-cabinet antenna transmits the radio signal to a second intra-cabinet antenna correspondingly connected to the storage node, and then the second intra-cabinet antenna transmits the radio signal to the storage node. The storage node determines whether the radio signal is storage data needed by the storage node, and the storage node analyzes and processes the radio signal if the radio signal is the storage data needed by the storage node, or the storage node transmits the radio signal to the second intra-cabinet antenna connected to the storage node if the radio signal is not the storage data needed by the storage node. The second intra-cabinet antenna transmits the radio signal to a third intra-cabinet antenna correspondingly connected to the memory node. The third intra-cabinet antenna transmits the received radio signal to the memory node. The memory node determines whether the radio signal is memory data needed by the memory node, and the memory node analyzes and processes the radio signal if the radio signal is the memory data needed by the memory node, or the memory node transmits the radio signal to a third inter-cabinet antenna, the third intra-cabinet antenna transmits the radio signal to a fourth intra-cabinet antenna connected to the computing node, and the fourth intra-cabinet antenna transmits the radio signal to the computing node if the radio signal is not the memory data needed by the memory node. The computing node determines whether the radio signal is computing request data needed by the computing node after receiving the radio signal, and the computing node parses and uses the radio signal if the radio signal is computing request data needed by the computing node, or the computing node transmits the radio signal to the fourth intra-cabinet antenna if the radio signal is not the computing request data needed by the computing node. The fourth intra-cabinet antenna transmits the radio signal to a wireless data controller. The wireless data controller transmits the radio signal to an inter-cabinet antenna connected to the wireless data controller. Under scheduling of the wireless data controller, the inter-cabinet antenna transmits the radio signal to another cabinet server.

Figure 12:
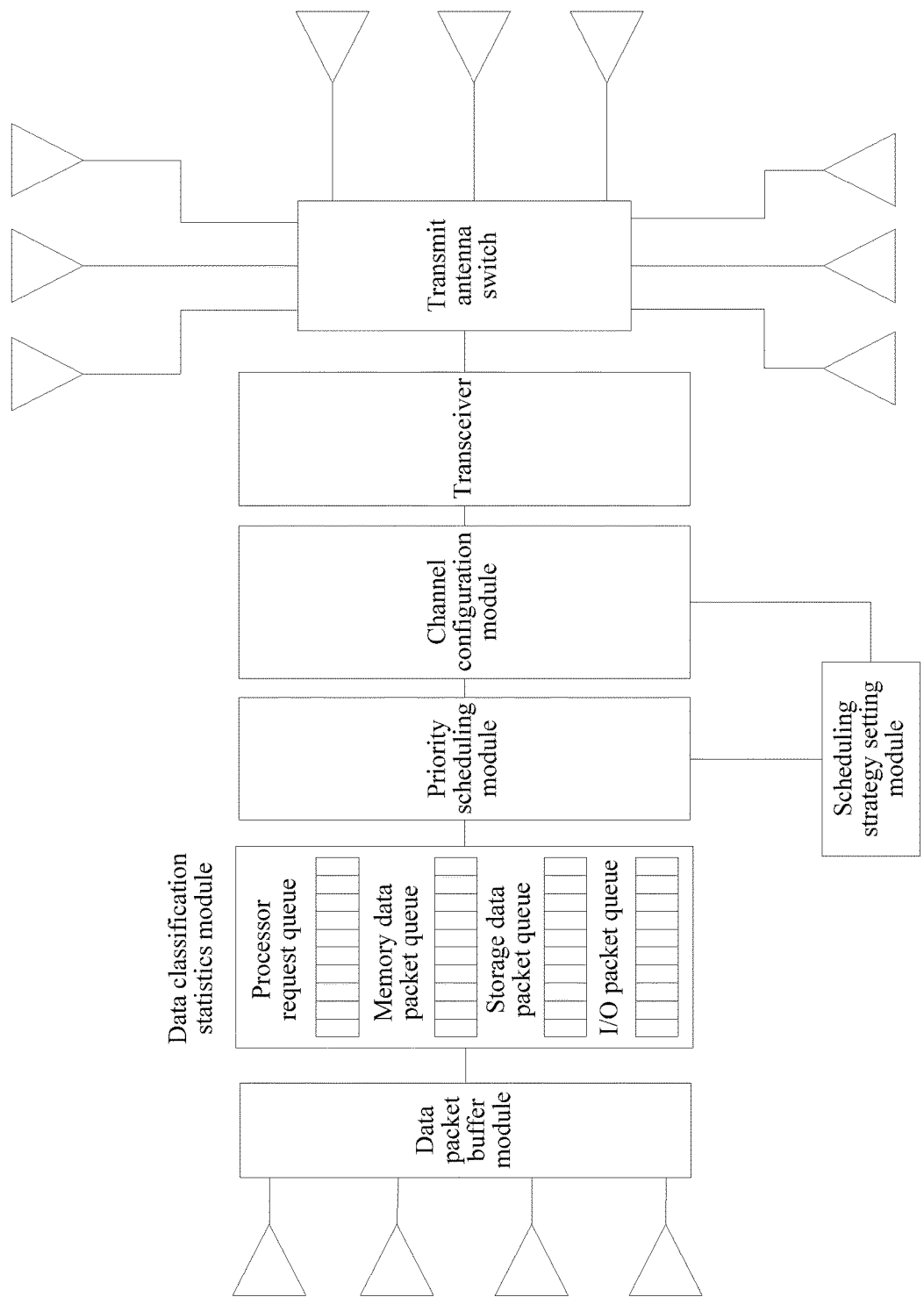
FIG. 12 is a schematic architectural diagram of a wireless data controller disclosed in the present disclosure.

Refer to a schematic architectural diagram of a wireless data controller shown in FIG. 12. The wireless data controller receives a radio signal transmitted by an intra-cabinet antenna disposed at a top layer and places the radio signal into a data packet buffer module. The data packet buffer module transmits the radio signal to a data classification statistics module. The data classification statistics module classifies the radio signal according to a data feature of the radio signal and saves the radio signal into a corresponding queue. For example, when function nodes of a cabinet server are a computing node, a memory node, a storage node, and an I/O node, the radio signal may be saved into a processor request queue, a memory data packet queue, a storage data packet queue, or an I/O packet queue according to the data feature of the radio signal. Then, the data classification statistics module transmits the classified radio signal to a priority scheduling module, and the priority scheduling module obtains a scheduling strategy preset in a scheduling strategy setting module and then transmits the radio signal to a channel configuration module. Then the channel configuration module transmits the radio signal to a transceiver. The transceiver transmits the radio signal to a transmit antenna switch. Then the transmit antenna switch transmits the radio signal to a corresponding inter-cabinet antenna, and the inter-cabinet antenna transmits the radio signal to a corresponding cabinet server.

It can be learned through the foregoing radio signal transmission process that a transmission path is formed of intra-cabinet antennas that are vertically adjacent to each other when a radio signal is transmitted within a cabinet server. All of the intra-cabinet antennas are connected to function nodes corresponding to the intra-cabinet antennas. Multiple layers of function nodes are generally included in the server core, and the multiple layers of function nodes and the intra-cabinet antennas are vertically arranged, thereby implementing vertical transmission of a radio signal.

In addition, referring to FIG. 3, a first intra-group communications element 21 generally transmits a radio signal to a second intra-group communications element in a form of an electromagnetic energy beam when a wireless data center performs radio signal intra-group transmission. An angle between the electromagnetic energy beam and a horizontal direction is a, which is used to represent a transverse diffusion range of the electromagnetic energy beam. In a transmission process, the electromagnetic energy beam encounters overlapping of radiation fields, which causes a transmission conflict. To reduce the transmission conflict and avoid deviation in a radiation field, the degree of the angle α needs to be controlled. Therefore, a radio signal needs to be transmitted using a narrow lobe.

However, in this application, the radio signal does not encounter overlapping of radiation fields such that the radio signal can be transmitted in a form of a wide lobe when a radio signal is transmitted in the foregoing manner, and when transmitted between adjacent intra-cabinet antennas, thereby improving transmission precision and efficiency.

The cabinet server further includes a bottom inter-cabinet antenna disposed at a bottom of the server core, and a bottom wireless data controller that is disposed at the bottom of the server core and that is connected to the bottom inter-cabinet antenna, where the bottom wireless data controller is connected to a function node at a bottom layer.

The bottom wireless data controller is configured to transmit a radio signal to the bottom inter-cabinet antenna such that the bottom inter-cabinet antenna transmit the radio signal to another cabinet server after receiving the radio signal transmitted by the function node at the bottom layer, and transmit the radio signal to the bottom inter-cabinet antenna after receiving a radio signal transmitted by the bottom inter-cabinet antenna of another cabinet server.

Refer to a schematic diagram of radio signal transmission shown in FIG. 11. When neither a bottom inter-cabinet antenna nor a bottom wireless data controller is disposed in a cabinet server, if a function node disposed at a bottom layer obtains a radio signal and the radio signal needs to be transmitted to another cabinet server, the radio signal needs to be sequentially transmitted by all layers of intra-cabinet antennas in order to transmit the radio signal to an intra-cabinet antenna corresponding to a function node at a top layer. Then, the intra-cabinet antenna corresponding to the function node at the top layer transmits the radio signal to another cabinet server.

After a bottom inter-cabinet antenna and a bottom wireless data controller are disposed in the cabinet server, if a function node at a bottom layer of the cabinet server obtains a radio signal and the radio signal needs to be transmitted to another cabinet server, the function node at the bottom layer may transmit the radio signal to the bottom wireless data controller using an intra-cabinet antenna connected to the function node. Under scheduling of the bottom wireless data controller, the bottom inter-cabinet antenna transmits the radio signal to the other cabinet server without a need of a process in which the radio signal is transmitted using multiple layers of intra-cabinet antennas, which further shortens a transmission path of the radio signal, reduces a transmission delay, and improves a transmission speed of the radio signal.

Further, referring to FIG. 8, the cabinet server includes at least two function nodes 100, multiple intra-cabinet antennas 200, multiple inter-cabinet antennas 300, and a wireless data controller 400. Moreover, the cabinet server further includes rack top antennas 110.

The rack top antennas 110 are disposed above the intra-cabinet antenna 200 disposed at the top layer, where the rack top antennas 110 and the intra-cabinet antennas 200 are vertically arranged, the rack top antennas 110 and the intra-cabinet antennas 200 at the top layer are wirelessly connected, and the rack top antennas 110 and the wireless data controller 400 are connected.

The rack top antenna 110 is configured to receive a radio signal transmitted by the intra-cabinet antenna 200 at the top layer and transmit the radio signal to the wireless data controller 400, and receive a radio signal transmitted by the wireless data controller 400 and then transmit the radio signal to the intra-cabinet antenna 200 at the top layer.

The intra-cabinet antenna 200 disposed at the top layer and the rack top antenna 110 are generally connected in a wireless connection form. In addition, the rack top antenna 110 is generally connected to the wireless data controller 400 in a wired form. If no rack top antenna 110 is disposed in the cabinet server, the intra-cabinet antennas 200 disposed at the top layer are directly connected to the wireless data controller 400. When the radio signal needs to be transmitted to another cabinet server, after obtaining the radio signal, the intra-cabinet antenna 200 at the top layer transmits the radio signal to the connected wireless data controller 400, and the wireless data controller 400 controls the inter-cabinet antenna 300 to transmit the radio signal to the other cabinet server. Alternatively, after receiving a radio signal transmitted by another cabinet server, the inter-cabinet antenna 300 transmits the radio signal to the intra-cabinet antenna 200 at the top layer using the wireless data controller 400, and the intra-cabinet antenna 200 at the top layer transmits the radio signal within the cabinet server.

After the rack top antennas 110 are disposed in the cabinet server, the rack top antennas 110 are connected to the wireless data controller 400, and the rack top antennas 110 are used as a radio signal transmission medium between the intra-cabinet antennas 200 at the top layer and the wireless data controller 400. The wireless data controller 400 transmits the radio signal to the intra-cabinet antenna 200 at the top layer using the rack top antenna 110, or the intra-cabinet antenna 200 at the top layer transmits the radio signal to the wireless data controller 400 using the rack top antenna 110. By means of setting of the rack top antennas 110, a radio signal transmission medium is added, which facilitates improvement of radio signal transmission quality.

Correspondingly, this application further discloses a data center. The data center includes the cabinet server described above.

In the data center, adjacent cabinet servers are wirelessly connected using an inter-cabinet antenna.

Figure 13:
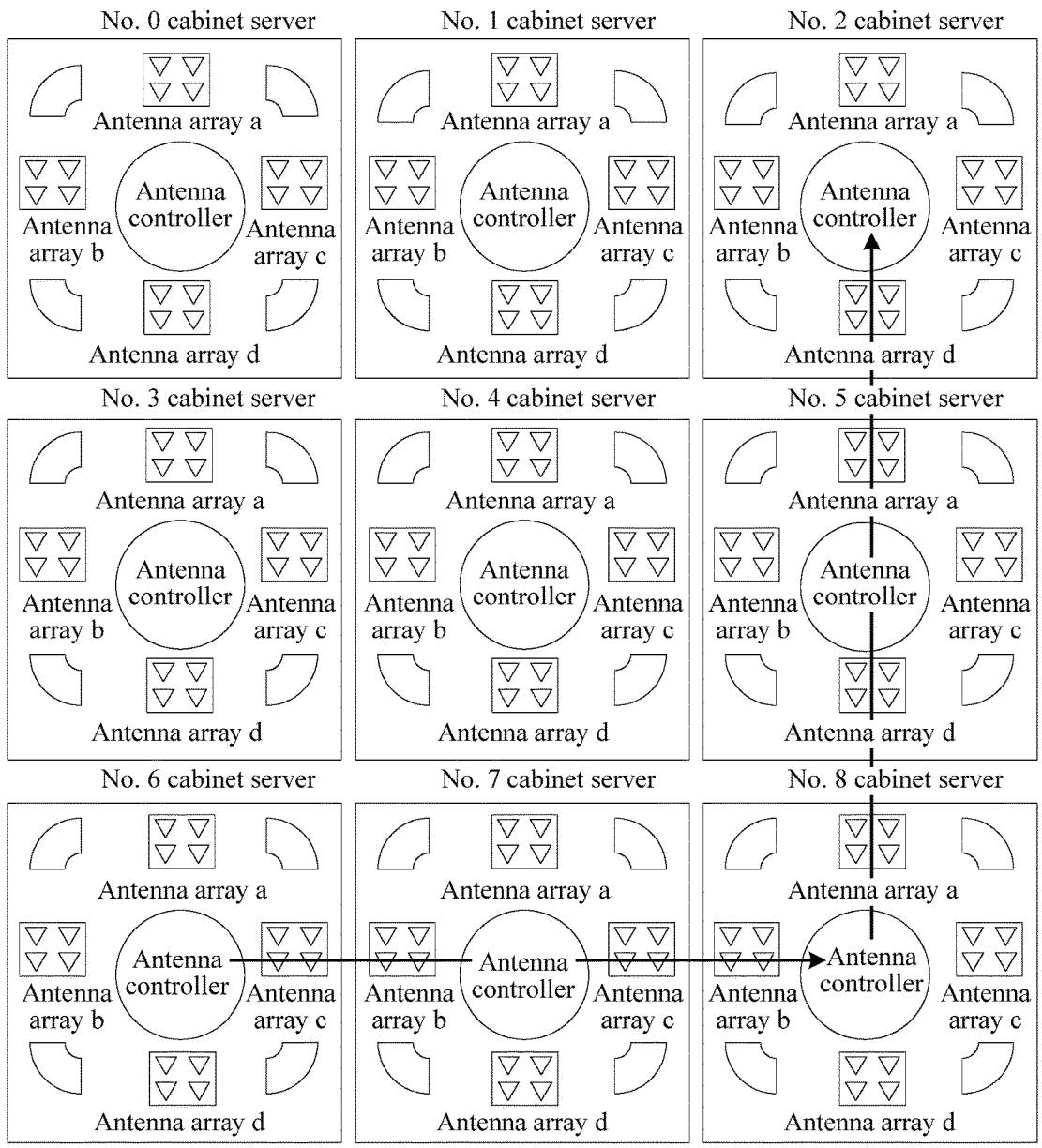
FIG. 13 is a schematic architectural diagram of a data center disclosed in the present disclosure.

Referring to a schematic architectural diagram of a data center shown in FIG. 13, the data center includes multiple cabinet servers, where the cabinet servers implement radio signal inter-cabinet transmission using a wireless connection formed by inter-cabinet antennas. For example, when a number (No.) 6 cabinet server needs to transmit a radio signal to a No. 2 cabinet server, a transmission path from the No. 6 cabinet server to a No. 7 cabinet server to a No. 8 cabinet server to a No. 5 cabinet server to the No. 2 cabinet server may be made according to a current occupied degree of each cabinet server. Certainly, another transmission path may be further made, which is not limited in this application.

In addition, in the data center, a housing of the cabinet server may be set to have multiple shapes. Generally, the housing is set to be square. Relative to a structure in another shape, a square structure has a relatively large available volume, and more devices can be deployed in the square structure. In the data center, the multiple cabinet servers are generally formed into a form of a square matrix, which facilitates radio signal transmission.

In the data center, used inter-cabinet antennas are generally directional antennas. Directional antennas in a same direction form an antenna array. A signal strength can be enhanced and an anti-interference capability can be improved when a radio signal is transmitted using the directional antennas.

A person skilled in the art may clearly understand that, the technologies in the embodiments of the present disclosure may be implemented by software in addition to a necessary general hardware platform. Based on such an understanding, the technical solutions of the present disclosure essentially or the part contributing to the prior art may be implemented in a form of a software product. The software product is stored in a storage medium, such as a read-only memory (ROM)/random-access memory (RAM), a hard disk, or an optical disc, and includes several instructions for instructing a computer device (which may be a personal computer, a server, or a network device) to perform the methods described in the embodiments or some parts of the embodiments of the present disclosure.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly, for related parts, reference may be made to partial descriptions in the method embodiment.

It should be noted that in this specification, relational terms such as first and second are only used to distinguish one entity or operation from another, and do not necessarily require or imply that any actual relationship or sequence exists between these entities or operations. Moreover, the term "include", or its any other variant is intended to cover a non-exclusive inclusion such that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

The foregoing descriptions are merely specific implementation manners of the present disclosure. It should be noted that a person of ordinary skill in the art may make several improvements or polishing without departing from the principle of the present disclosure and the improvements or polishing shall fall within the protection scope of the present disclosure.

The foregoing descriptions are implementation manners of the present disclosure, but are not intended to limit the protection scope of the present disclosure. Any modification, equivalent replacement, and improvement made without departing from the spirit and principle of the present disclosure shall fall within the protection scope of the present disclosure.

What is claimed is:

1. A cabinet server, comprising:
a plurality of function node layers vertically arranged to form a server core, wherein each of the plurality of function node layers comprises at least one function node; and
a plurality of intra-cabinet antennas vertically arranged and disposed at one side of the server core, each intra-cabinet antenna of the plurality of intra-cabinet antennas is coupled to a corresponding one of the plurality of function node layers, the each intra-cabinet antenna of the plurality of intra-cabinet antennas configured to form a transmission path by transmitting a radio signal received from a vertically adjacent one of the plurality of intra-cabinet antennas to another vertically adjacent one of the plurality of intra-cabinet antennas.

2. The cabinet server of claim 1, further comprising:
an inter-cabinet antenna disposed on a top one of the plurality of function node layers; and
a wireless data controller coupled to the inter-cabinet antenna and a first portion of the plurality of intra-cabinet antennas disposed at the top one of the plurality of function node layers, the wireless data controller configured to receive, from the first portion of the plurality of intra-cabinet antennas, the radio signal and to transmit, through the inter-cabinet antenna, the radio signal for receipt by another cabinet server.

3. The cabinet server of claim 2, further comprising a wireless shield layer around an outside of the server core, and the plurality of intra-cabinet antennas, the inter-cabinet antenna, and the wireless data controller are disposed at an outside of the wireless shield layer.

4. The cabinet server of claim 3, further comprising an antenna backplane disposed at the outside of the wireless shield layer and configured to fasten the plurality of intra-cabinet antennas.

5. The cabinet server of claim 3, further comprising an extension plate disposed at the outside of the wireless shield layer disposed and in parallel with the each of the plurality of function node layers, the extension plate configured to fasten the plurality of intra-cabinet antennas.

6. The cabinet server of claim 2, further comprising:
another inter-cabinet antenna disposed at a bottom one of the plurality of function node layers; and
another wireless data controller coupled to the at least one function node of the bottom one of the plurality of function node layers and the another inter-cabinet antenna, the another wireless data controller configured to receive, from the at least one function node, the radio signal and to transmit, through the another inter-cabinet antenna, the radio signal for receipt by the another cabinet server.

7. The cabinet server of claim 2, further comprising a plurality of rack top antennas disposed above, and wirelessly connected to, the plurality of intra-cabinet antennas disposed at the top one of the plurality of the plurality of function node layers, the plurality of rack top antennas coupled to the wireless data controller to receive a radio signal transmitted by one of the plurality of intra-cabinet antennas disposed at the top one of the plurality of function node layers and provide the radio signal to the wireless data controller.

8. The cabinet server of claim 1, wherein a hollow cavity is formed between adjacent ones of the plurality of function node layers.

9. The cabinet server of claim 1, wherein the at least one function node comprises a computing node, a memory node, a storage node, or an input/output node.

10. A data center, comprising:
a plurality of cabinet servers, wherein each of the plurality of cabinet servers comprises:
a plurality of function node layers vertically arranged to form a server core, wherein each of the plurality of function node layers comprises at least one function node; and
a plurality of intra-cabinet antennas vertically arranged and disposed at one side of the server core, each intra-cabinet antenna of the plurality of intra-cabinet antennas is coupled to a corresponding one of the plurality of function node layers, the each intra-cabinet antenna of the plurality of intra-cabinet antennas configured to form a transmission path by transmitting a radio signal received from a vertically adjacent one of the plurality of intra-cabinet antennas to another vertically adjacent one of the plurality of intra-cabinet antennas.

11. The data center of claim 10, wherein the each of the plurality of cabinet servers further comprises:
an inter-cabinet antenna disposed on a top one of the plurality of function node layers; and
a wireless data controller coupled to the inter-cabinet antenna and a first portion of the plurality of intra-cabinet antennas disposed at the top one of the plurality of function node layers, the wireless data controller configured to receive, from the first portion of the plurality of intra-cabinet antennas, the radio signal and to transmit, through the inter-cabinet antenna, the radio signal for receipt by another cabinet server.

12. The data center of claim 11, wherein the each of the plurality of cabinet servers further comprises a wireless shield layer around an outside of the server core, and the plurality of intra-cabinet antennas, the inter-cabinet antenna, and the wireless data controller are disposed at an outside of the wireless shield layer.

13. The data center of claim 12, wherein the each of the plurality of multiple cabinet servers further comprises an antenna backplane disposed at the outside of the wireless shield layer and configured to fasten the plurality of intra-cabinet antennas.

14. The data center of claim 12, wherein the each of the plurality of cabinet servers further comprises an extension plate disposed at the outside of the wireless shield layer and in parallel with the each of the plurality of function node layers, the extension plate configured to fasten the plurality of intra-cabinet antennas.

15. The data center of claim 12, wherein adjacent cabinet servers of the plurality of cabinet servers are wirelessly connected through respective inter-cabinet antennas.

16. The data center of claim 11, wherein the each of the plurality of cabinet servers further comprises:
another inter-cabinet antenna disposed at a bottom one of the plurality of function node layers; and
another wireless data controller coupled to the at least one function node of at the bottom one of the plurality of function node layers and the another inter-cabinet antenna, the another wireless data controller configured to receive, from the at least one function node, the radio signal and to transmit, through the another inter-cabinet antenna, the radio signal for receipt by the another cabinet server.

17. The data center of claim 11, wherein the each of the plurality of cabinet servers further comprises a plurality of rack top antennas disposed above, and wirelessly connected to, the plurality of intra-cabinet antennas disposed at the top one of the plurality of function node layers, the plurality of rack top antennas coupled to the wireless data controller to receive a radio signal transmitted by the intra-cabinet antennas at the first portion of the plurality of intra-cabinet antennas disposed at the top one of the plurality of function node layers and provide the radio signal to the wireless data controller.

18. The data center of claim 10, wherein a hollow cavity is formed between adjacent ones of the plurality of function node layers for the each of the plurality of cabinet servers.

19. The data center of claim 10, wherein the at least one function node comprises a computing node, a memory node, a storage node, or an input/output node.

* * * * *

UNITED STATES PATENT AND TRADEMARK OFFICE
CERTIFICATE OF CORRECTION

PATENT NO. : 10,069,189 B2
APPLICATION NO. : 15/276207
DATED : September 4, 2018
INVENTOR(S) : Shaojie Chen et al.

Page 1 of 1

It is certified that error appears in the above-identified patent and that said Letters Patent is hereby corrected as shown below:

On the Title Page

Page 2, Reference Cited, U.S. Patent Documents should read:
20130272285 A1 1/2013 Inada In the Claims Column 14, Line 57, Claim 5 should read:
layer and in parallel with the each of the plurality Signed and Sealed this
Sixth Day of November, 2018

Andrei Iancu
*Director of the United States Patent and Trademark Office*